No. 631,806. Patented Aug. 29, 1899.
D. W. MENDENHALL.
COMBINED VEHICLE PROPELLER AND POWER TRANSMITTING MACHINE.
(Application filed Nov. 22, 1898.)
(No Model.) 3 Sheets—Sheet 1.
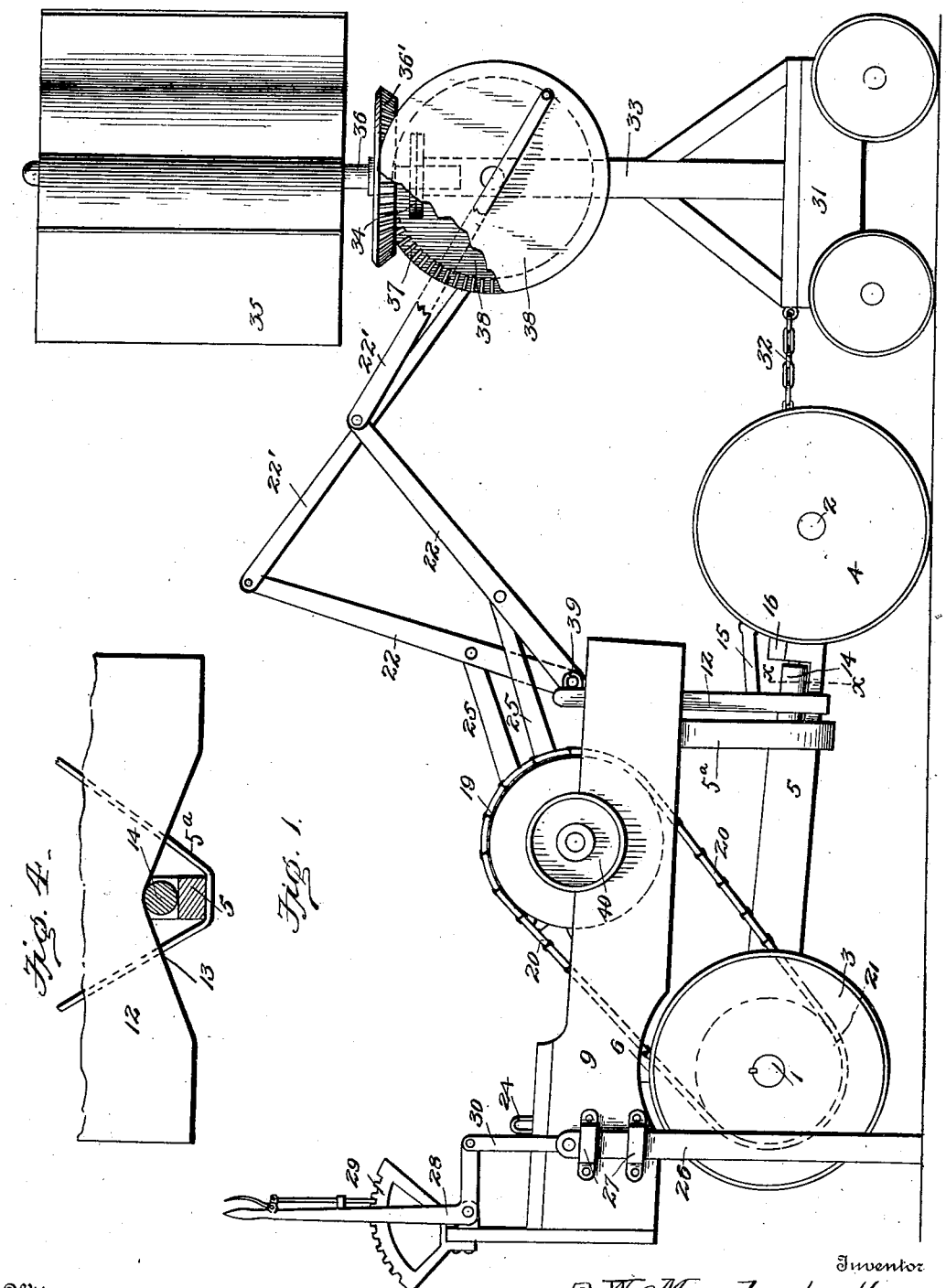

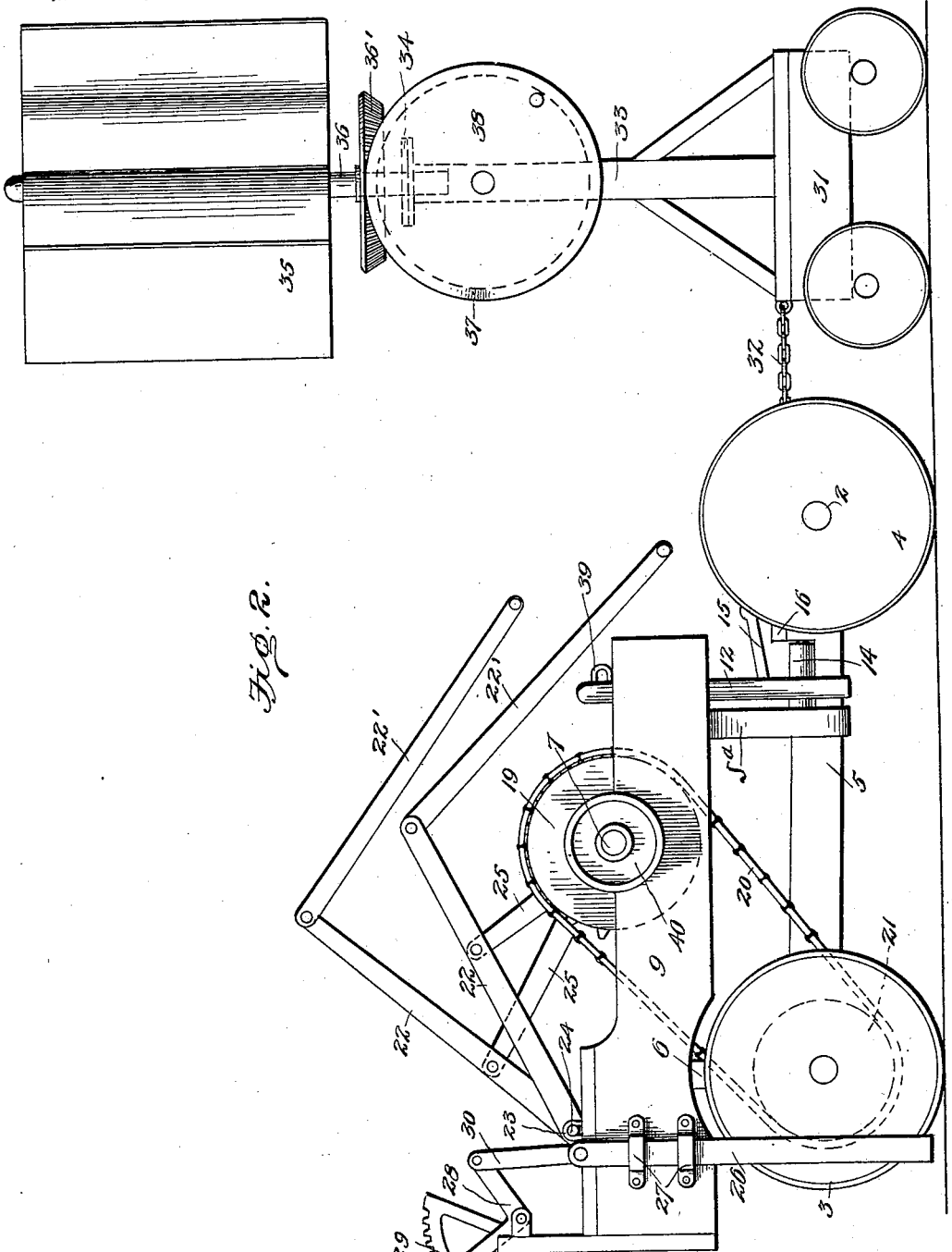

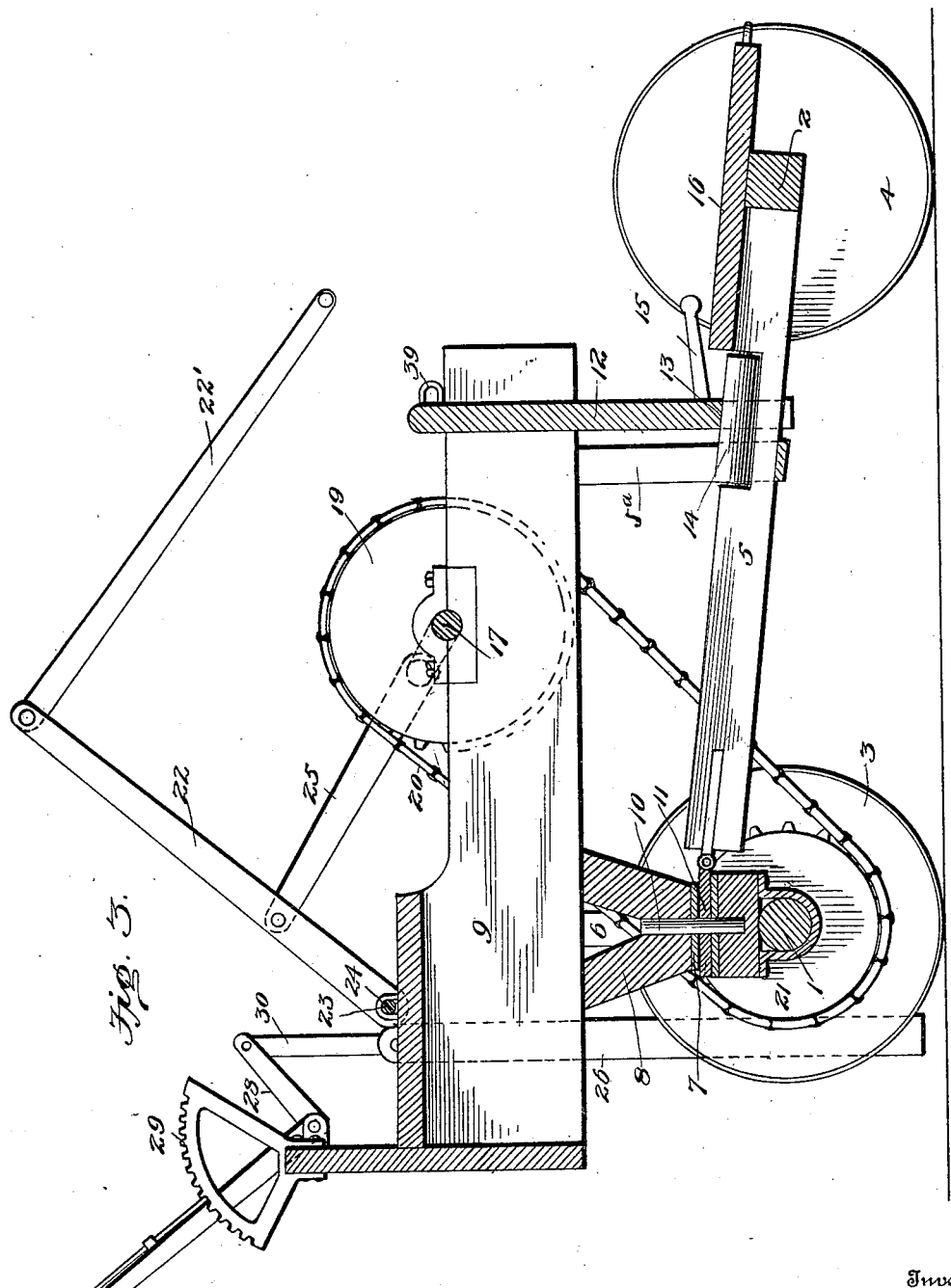

UNITED STATES PATENT OFFICE.

DANIEL W. MENDENHALL, OF KANSAS CITY, MISSOURI.

COMBINED VEHICLE-PROPELLER AND POWER-TRANSMITTING MACHINE.

SPECIFICATION forming part of Letters Patent No. 631,806, dated August 29, 1899.

Application filed November 22, 1898. Serial No. 697,190. (No model.)

*To all whom it may concern:*

Be it known that I, DANIEL W. MENDENHALL, a citizen of the United States, residing at Kansas City, in the county of Jackson and State of Missouri, have invented certain new and useful Improvements in a Combined Vehicle-Propeller and Power-Transmitting Machine; and I do declare the following to be a full, clear, and exact description of the invention, such as will enable others skilled in the art to which it appertains to make and use the same.

The invention relates to a combined vehicle-propeller and power-transmitting machine.

The object of the invention is to provide means for manually propelling a vehicle and its wind-motor from place to place, and when it reaches its destination the drive-wheels are raised from engagement with the ground and the hand-operating levers are connected with the drive-wheel of the wind-motor, so that the power generated by said motor may be transmitted to one of the rotary shafts of the vehicle and in turn be transmitted from said shaft to any machinery desired to be driven—such, for instance, as a wood-sawing machine, a mill, or threshing-machine. After the work has been done at this point the operating-levers of the vehicle may be detached from the wind-motor and the drive-wheels lowered into engagement with the ground, the wind-motor coupled to the vehicle, and when the parts are in this position the hand-operating levers may be worked and the vehicle, with its wind-motor, may be driven to another point to be used as a motor for the driving of machinery.

With this object in view the invention consists in certain features of construction and combination of parts, which will be hereinafter fully described and claimed.

In the drawings, Figure 1 is a side elevation of the vehicle with its drive-wheels elevated above the ground and the wind-motor geared with one of the rotary shafts of the vehicle and a drive-belt leading from said shaft to the band-wheel of the machine to be driven. Fig. 2 is a similar view showing the wind-motor coupled to the vehicle and the operating-levers in position to propel the vehicle from place to place. Fig. 3 is a longitudinal sectional view, on an enlarged scale, taken centrally through the vehicle; and Fig. 4 is a fragmentary sectional view on the line X X of Fig. 1.

In the drawings, 1 denotes the front axle; 2, the rear axle; 3, the front supporting-wheels; 4, the rear supporting-wheels, and 5 the reach, which is hung in a flexible strap 5$^a$, which limits the lateral throw or movement of said reach.

6 denotes bolster-arms, in the lower ends of which the front axle is journaled, it being understood that the front wheels are fixed to said axle.

7 denotes the turn-table supported by a bracket 8, depending from the body or bed portion 9 of the vehicle.

10 denotes a king-bolt extending through the turn-table and through an aperture of the plate 11, secured to the forward end of the reach, whereby said reach is pivotally connected to the bracket.

The rear end of the body portion of the vehicle is provided with a downwardly-extending plate 12, having a curved recess 13 in its lower edge, the face of which rides upon the antifriction-roller 14, pivoted near the rear end of the reach.

15 denotes a steering-lever, by means of which the rear supporting-wheels may be thrown from side to side in the act of steering the vehicle. In operating this lever 15 the curved edge of the plate engages the roller 14 and thereby lessens the friction, and as the plate is moved from side to side in the act of steering the machine the rear end of the body portion of the machine is raised and lowered, due to the curved lower edge of the plate, such movement being permitted by the two-part hinged plate 11.

Secured to the axletree of the rear supporting-wheels is a platform 16, upon which the workmen or operators stand in the act of propelling the vehicle.

17 denotes a transverse cranked power-shaft journaled in suitable bearings in the body of the vehicle and having keyed thereto one or more sprocket-wheels 19, connected by chains 20 to sprocket-wheels 21, fixed to the forward axle of the vehicle, so that the motion from the cranked shaft may be transmitted to the axle to drive the vehicle.

22 denotes the operating-levers, which when the vehicle is adapted to be propelled have their ends pivoted on the transverse rod 23, held in staple-bearings 24 at the forward end of the machine. The free ends of these levers are provided with pivoted handles 22', which project over the rear platform within convenient reach of the operators. These levers are connected to the cranks of the transverse power-shaft by pivoted links 25, so that by operating the handles the vehicle will be driven along.

26 denotes prop-posts sliding in strap-bearings 27, secured to the sides of the body portion of the vehicle at its front end.

28 denotes bell-crank levers, the upper ends of which work in a segmental rack 29 and the lower ends of which are connected to the upper ends of the props by means of links 30, whereby when the props are lowered the front wheels of the vehicle will be raised from the ground and held in their elevated adjustment for a purpose hereinafter to appear.

31 denotes the wheel-supporting frame of a wind-motor, which is adapted to be attached to the platform of the vehicle in any suitable manner—as, for instance, by chains 32. 33 denotes a supporting-post carried by the said wheel-frame and supporting a turn-table 34, upon which revolves a wind-wheel 35, having a vertical shaft 36, provided with a gear-wheel 36' in mesh with the crown-teeth 37 on the crank-wheels 38.

When it is desired to propel the cranked power-shaft of the vehicle by the wind-motor, the rod upon which the operating-levers are journaled is removed from its staples at the forward end of the frame of the vehicle, and the lower ends of the levers are reversed—that is, swung over to the rear end of the machine—and the rod passed through similar eyes 39 and through said lower ends of the levers. The pivoted handles of the levers are then attached to the crank-wheel, and the forward end of the vehicle is now elevated by lowering the props, so as to raise the front wheels free from the ground. In this position it will be seen that the transverse drive-shaft will be rotated by the wind-wheel, and the power from said shaft may be transmitted to any machine desired to be driven by a belt placed round a pulley 40, secured to one end of said power-shaft. If there be not a sufficient amount of wind to drive the machine, the operating-handles may be disengaged from the crank-wheel and be worked manually.

From the foregoing description, taken in connection with the accompanying drawings, the construction, operation, and advantages of the invention will be apparent without requiring an extended explanation.

Having thus described my invention, what I claim, and desire to secure by Letters Patent, is—

1. The combination with the vehicle-body, the front axle journaled thereto and having fixed to its ends supporting-wheels, the rear axle, a reach having its forward end pivoted to a bracket depending from the forward end of the wagon-body and its rear end connected to the rear axle, an antifriction-roller carried by the rear end of the reach, wheels journaled upon the rear axle, a plate depending from the rear end of the body of the vehicle and having a curved recess the wall of which engages the antifriction-roller carried by the reach, a steering-lever, a cranked power-shaft carried by the body of the vehicle, sprocket-wheels secured to the front axle and to the power-shaft, chains connecting said sprocket-wheels, operating-levers having changeable fulcrums, links connecting the operating-levers with the cranked power-shaft, substantially as set forth.

2. The combination with the vehicle-body, the front axle journaled thereto and having fixed to its ends supporting-wheels, the rear axle, a reach having its forward end pivoted to a bracket depending from the forward end of the wagon-body and its rear end connected to the rear axle, an antifriction-roller carried by the rear end of the reach, wheels journaled upon the rear axle, a plate depending from the rear end of the body of the vehicle and having a curved recess the wall of which engages the antifriction-roller carried by the reach, a steering-lever, a cranked power-shaft carried by the body of the vehicle, sprocket-wheels secured to the front axle and to the power-shaft, chains connecting said sprocket-wheels, operating-levers having changeable fulcra, links connecting the operating-levers with the cranked power-shaft, props for elevating the front wheels, a wheel-frame carrying a wind-motor, a crank-wheel rotated by said wind-motor, and means for connecting the operating-levers of the vehicle with the crank-wheel, substantially as set forth.

In testimony whereof I have hereunto set my hand in presence of two subscribing witnesses.

DANIEL W. MENDENHALL.

Witnesses:
GEO. A. MCKINNY,
A. M. TAYLOR.